(12) United States Patent
Hognaland et al.

(10) Patent No.: US 12,743,084 B2
(45) Date of Patent: Sep. 22, 2026

(54) METHOD AND SYSTEM FOR DETECTING POSITION OF A VEHICLE RELATIVE TO TRACKS THE VEHICLE IS RUNNING ON

(71) Applicant: AutoStore Technology AS, Nedre Vats (NO)

(72) Inventors: Ingvar Hognaland, Nedre Vats (NO); Ivar Fjeldheim, Haugesund (NO); Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 22 days.

(21) Appl. No.: 18/924,890

(22) Filed: Oct. 23, 2024

(65) Prior Publication Data

US 2025/0053173 A1 Feb. 13, 2025

Related U.S. Application Data

(63) Continuation of application No. 17/489,355, filed on Sep. 29, 2021, now Pat. No. 12,189,396, which is a (Continued)

(30) Foreign Application Priority Data

Nov. 2, 2016 (NO) .................................... 20161734

(51) Int. Cl.
*G05D 1/00* (2024.01)
*G05D 1/243* (2024.01)
(Continued)

(52) U.S. Cl.
CPC ......... *G05D 1/0244* (2013.01); *G05D 1/0212* (2013.01); *G05D 1/0287* (2013.01); (Continued)

(58) Field of Classification Search
CPC ...... G05D 1/0244; G05D 1/617; G05D 1/692; G05D 1/243; G05D 1/0212; G05D 1/0287
See application file for complete search history.

(56) References Cited

U.S. PATENT DOCUMENTS 4,379,497 A 4/1983 Hainsworth
4,593,239 A * 6/1986 Yamamoto ........... G05D 1/0244 318/587
(Continued)

FOREIGN PATENT DOCUMENTS

CN 101636772 A 1/2010
CN 102047076 A 5/2011
(Continued)

OTHER PUBLICATIONS

Office Action issued in Chinese Application No. 201780067540.3; Dated Jul. 15, 2021 (12 pages).
(Continued)

*Primary Examiner* — Naeem Taslim Alam
(74) *Attorney, Agent, or Firm* — Baker Botts L.L.P.

(57) ABSTRACT

A vehicle for an automated storage and retrieval system is configured to follow a route relative to tracks of the automated storage and retrieval system. The route includes one or more track crossings. The vehicle includes a first set of wheels capable of moving the vehicle in a first direction; a second set of wheels capable of moving the vehicle in a second direction perpendicular to the first direction; and one or more sensors attached to the vehicle and configured to detect the one or more track crossings while the vehicle is moving in the first direction or the second direction.

19 Claims, 2 Drawing Sheets

Related U.S. Application Data continuation of application No. 16/347,138, filed as application No. PCT/EP2017/077175 on Oct. 24, 2017, now Pat. No. 11,262,765.

(51) Int. Cl.
*G05D 1/617* (2024.01)
*G05D 1/692* (2024.01)

(52) U.S. Cl.
CPC ............ *G05D 1/243* (2024.01); *G05D 1/617* (2024.01); *G05D 1/692* (2024.01)

(56) References Cited

U.S. PATENT DOCUMENTS

| | | | | |
|---|---|---|---|---|
| 4,711,316 | A | 12/1987 | Katou | |
| 4,846,297 | A | 7/1989 | Field | |
| 6,157,320 | A | 12/2000 | Yujiri | |
| 6,246,956 | B1 | 6/2001 | Miyoshi et al. | |
| 6,285,951 | B1 | 9/2001 | Gaskins et al. | |
| 9,896,106 | B1 | 2/2018 | Wrobel | |
| 2012/0325979 | A1 | 12/2012 | Yoon | |
| 2013/0194423 | A1* | 8/2013 | Baines | B61L 23/00 348/148 |
| 2015/0260535 | A1 | 9/2015 | Yoshida et al. | |
| 2015/0307276 | A1* | 10/2015 | Hognaland | B65G 1/0464 |
| 2016/0229630 | A1 | 8/2016 | Gebhardt et al. | |
| 2016/0272465 | A1 | 9/2016 | Nakano | |
| 2016/0347544 | A1 | 12/2016 | Kvifte | |
| 2017/0123429 | A1 | 5/2017 | Levinson | |
| 2018/0094920 | A1* | 4/2018 | Kiss | G06T 7/248 |
| 2019/0047786 | A1* | 2/2019 | Suzuki | B65G 1/0464 |
| 2019/0196500 | A1 | 6/2019 | Harasaki | |

FOREIGN PATENT DOCUMENTS

| | | | |
|---|---|---|---|
| CN | 102937812 | A | 2/2013 |
| CN | 103964154 | A | 8/2014 |
| CN | 103985267 | A | 8/2014 |
| CN | 105899398 | A | 8/2016 |
| EP | 1037828 | B1 | 9/2003 |
| EP | 3050824 | A1 | 8/2016 |
| JP | S62-113210 | A | 5/1987 |
| JP | H01-180012 | A | 7/1989 |
| JP | H03-290712 | A | 12/1991 |
| JP | 2008117204 | A | 5/2008 |
| JP | 2014168295 | A | 9/2014 |
| JP | 2016/506346 | A | 3/2016 |
| JP | 201637192 | A | 3/2016 |
| JP | 2019533858 | A | 11/2019 |
| NO | 0317366 | B1 | 10/2004 |
| SU | 880843 | A1 | 11/1981 |
| WO | 2014152369 | A2 | 9/2014 |
| WO | 2015/019055 | A1 | 2/2015 |
| WO | 2015029237 | A1 | 3/2015 |
| WO | 2015/140216 | A1 | 9/2015 |
| WO | 2015180090 | A1 | 12/2015 |
| WO | 2015193278 | A1 | 12/2015 |

OTHER PUBLICATIONS

Office Action issued in Japanese Application No. 2019-522289; Dated Sep. 29, 2021 (7 pages).
Manual entitled, “An introduction to the AutoStore system”, Jakob Hatteland Computer AS, Jan. 30, 2004, 36 pages, Norway.
Braunl, “ Embedded Robotics: Mobile Robot Design and Applications with Embedded Systems” Second Edition, 2006, 17 pages, Springer.
Everett, “Embedded Robotics: Mobile Robot Design adn Applications with Embedded Systems” Second Edition, 2006, 27 pages, CRC Press.
Preliminary Opinion issued in European Application 17790755.7, dated Oct. 18, 2021, (15 pages) .
Office Action issued in Chinese Application No. 201780067540.3; Dated Mar. 9, 2022 (12 pages).
D5 Figure 16 ( 2 pages).
Regtien, “Optical Sensors”, eccora, ECC3752, Exhibit 27, Sensors for Mechatronics, London, Elsevier Science, 2012 (14 pages).
Morriss, “Automated Manufacturing Systems: Actuators, Controls, Sensors and Robotics”, eccora, ECC3752-Exhibit 1-Automated Manufacturing Systems—Actuators, Controls, Sensors and Robotics, New York, 1995 (7 pages).
Fernando, “Distance Imaging and Proximity Sensors”. In Bishop, Robert H (ed.). The Mechatronics Handbook (2nd ed.), eccora, ECC3752—Exhibit 4—The Mechatronics Handbook Boca Raton, FL, 2008 (4 pages).
Third Auxiliary Request Claims, marked up copy (2 pages).
Fourth Auxiliary Request Claims, marked up copy (2 pages).
Fifth Auxiliary Request Claims, marked up copy (2 pages).
Sixth Auxiliary Request Claims, marked up copy (2 pages).
Seventh Auxiliary Request Claims, marked up copy (2 pages).
First Auxiliary Request Claims, clean copy (2 pages).
First Auxiliary Request Claims, marked copy (2 pages).
Second Auxiliary Request Claims, clean copy (2 pages).
Second Auxiliary Request Claims, marked copy (2 pages).
Grounds of Appeal filed in European Patent No. EP3535634 dated Jan. 24, 2023 (15 pages).
Office Action issued in the counterpart Japanese Application No. 2022-096396, mailed Aug. 24, 2023 (8 pages).
International Search Report issued in Application No. PCT/EP2017/077175, mailed on Jan. 22, 2018 (5 pages).
Written Opinion issued in International Application No. PCT/EP2017/077175, mailed on Jan. 22, 2018 (8 pages).
International Preliminary Report on Patentability issued in Application No. PCT/EP2017/077175, mailed on Jan. 28, 2019 (17 pages).
Search Report issued in Norwegian Application No. 20161734, mailed on May 11, 2017 (2 pages).
Office Action in counterpart European Patent Application No. 17790755.7 issued on Apr. 20, 2021 (34 pages).
Kazimov Grigorij A, Rogonov Yurij S; English Translation of Soviet patent application SU880843A1, “Apparatus for Monitoring Electric-Train Position”; Nov. 15, 1981; Espacenet (Year: 1981).
International Search Report issued in Application No. PCT/EP2017/077175, mailed on Jan. 22, 2018 (10 pages).
Zhai Liwen, First Office Opinion Notice for Chinese Patent Application No. 202210994274.1 dated Dec. 31, 2024, 16 pages, pub. by SIPO, Beijing, China.

* cited by examiner

METHOD AND SYSTEM FOR DETECTING POSITION OF A VEHICLE RELATIVE TO TRACKS THE VEHICLE IS RUNNING ON

BENEFIT CLAIM

This application claims the benefit under 35 U.S.C. § 120 as a continuation of application Ser. No. 17/489,355, filed Sep. 29, 2021, which is a continuation of application Ser. No. 16/347,138, filed May 2, 2019, which claims the benefit as a National Stage entry of PCT/EP2017/077175, filed Oct. 24, 2017, which claims the benefit of Norwegian application No. 20161734, filed Nov. 2, 2016, the entire contents of which are hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

BACKGROUND

A remotely operated vehicle or robot for picking up storage bins from a storage system is known. A detailed description of a relevant prior art storage system is presented in EP1037828B1, and details of a prior art vehicle being suitable for such a storage system is disclosed in detail in Norwegian U.S. Pat. No. 317,366B1 and WO2015193278A1. Such prior art storage systems comprise a three-dimensional storage grid containing storage bins that are stacked on top of each other up to a certain height. The storage grid is normally constructed as aluminium columns interconnected by top rails or tracks, onto which a plurality of remotely operated vehicles, or robots, are arranged to move laterally. Each vehicle is equipped with motors for moving the vehicle from one position to another and for driving a lift device adapted for picking up, carrying, and placing bins that are stored in the storage grid. A power supply is supplying power to the motors and drivers comprised in the vehicle, e.g. a rechargeable battery. The vehicle typically communicates with a control system via a wireless link and can be recharged at a charging station when needed.

Rotation of the wheels may be driven by belts connected to the wheels or by individual driving means situated at or at least partly within the wheels. The last example will provide a responsive robot with high control of acceleration and deceleration between a start and a stop position.

When a robot is moving on the tracks, it is controlled to accelerate from a start position and decelerate to a stop position. The start and stop positions will depend on the route set up for a robot prior to picking up a bin from one storage column in the storage grid and placing it in another storage column. A set route of a robot will typically comprise several start and stop positions. A route for a specific robot will be set up by a supervisory system having control of all storage bins and their content as well as the positions of the vehicles handling the bins.

When operating and controlling a robot following a set route relative to tracks laid out on a frame structure forming a grid, it is vital to always keep track of all operating robots and their positions. The positions of a robot can be acquired in different ways. One way is to track the position of the robot relative to the tracks on top of the frame structure. The position can be acquired by means of tracking devices located externally to the robot or by devices integrated in the robot.

JP H03 290712A describes a method for tracking position of a remotely operated trackless vehicle following a set route relative to induction guide paths laid out as floor tiles forming a frame structure. The vehicle has integrated sensors for detecting crossings of the guide paths along a route. Signals are transmitted to a controller for controlling the vehicle according to number of crossings passed.

By using integrated tracking devices, the robot itself will be able to keep track of its position. Integrated tracking devices are however quite complex systems and not necessarily very precise.

There is a need for a simple yet precise way of detecting the position of a robot running on tracks, relative to a frame structure.

According to embodiments of the present invention, the position of the robot is detected by integrated tracking devices tracking the number of crossings passed in x- and y-directions relative to tracks laid out as a grid structure as well as detecting distance to the next track crossing.

SUMMARY

In one aspect, embodiments disclosed herein are defined by a method for tracking the position of a remotely operated vehicle following a set route relative to tracks laid out on a frame structure forming a storage grid, the vehicle having first and second sets of wheels connected to drives for moving the vehicle in corresponding x- and y-directions on the grid, comprising:

- receiving information of a total number of track crossings to pass between start and stop positions in x- and y-directions according to the set route;
- directing sensors attached to the vehicle at the tracks along the route of the vehicle, characterized in that
- at least a first sensor is attached to a wheel support on one side of the vehicle, in the x-direction, and a second sensor is attached to a wheel support on the other side of the vehicle, in the y-direction, and
- detecting and monitoring track crossings passed when moving the vehicle in the x- and y-directions according to the set route by means of wheel supports that are active, enabling contact between wheels and tracks, where the sensors attached to the active wheel supports, are arranged for detecting the track crossings, and the sensors attached to passive wheel supports, are arranged for measuring distance to next track crossing;
- transmitting a signal to a controller, controlling the drives of the wheels of the vehicle, when the number of track crossings passed is close to the total number of track crossings to pass between the start and stop positions in respective x- and y-directions along the set route.

Further features of the method are defined in the dependent claims.

In one aspect, embodiments disclosed herein are also defined by a remotely operated vehicle for tracking the position of the vehicle following a set route relative to tracks laid out on a frame structure forming a storage grid, the vehicle having first and seconds sets of wheels connected to drives for moving the vehicle in corresponding x- and y-directions on the grid, said vehicle comprises:

- means for receiving information of number of track crossings to pass between start and stop positions in x- and y-directions according to the set route,
- sensors attached to the vehicle and directed at the tracks along the route of the vehicle, characterized in that at least a first sensor is attached to a wheel support on one side of the vehicle, in the x-direction, and a second sensor is attached to a wheel support on the other side of the vehicle, in the y-direction, and further comprising:

means for detecting and monitoring track crossings passed when moving the vehicle in the x- and y-directions according to the set route by means of wheel supports that are active, enabling contact between wheels and tracks, where the sensors attached to the active wheel supports are arranged for detecting the track crossings, and the sensors attached to passive wheel supports, are arranged for measuring distance to next track crossing;

controller for controlling the drives of the wheels of the vehicle when the number of track crossings passed is close to the total number of track crossings to pass between the start and stop positions in respective x- and y-directions along the set route.

In one embodiment, the at least first and/or second sensors are optical sensors.

Other aspects and advantages of the claimed subject matter will be apparent from the following description and the appended claims.

BRIEF DESCRIPTION OF DRAWINGS

Embodiments of the invention will now be described with reference to the figures, where.

DETAILED DESCRIPTION

In one aspect, embodiments disclosed herein comprise a remotely operated vehicle, hereafter called robot, for tracking the position of the robot following a set route relative to tracks laid out on a frame structure forming a grid.

Figure 1:
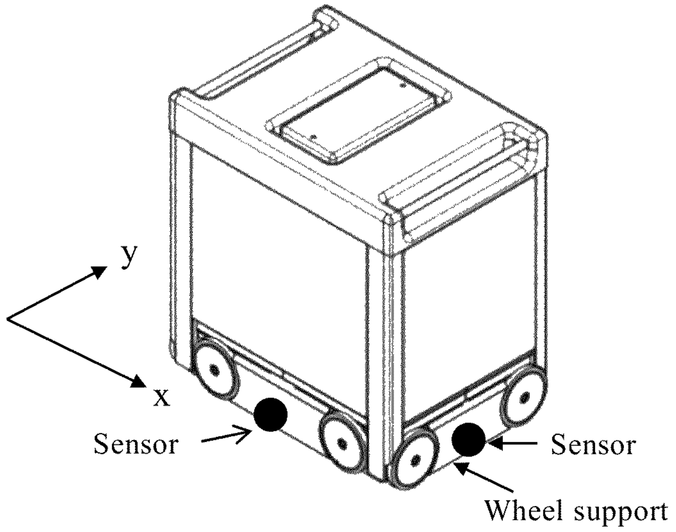
FIG. 1 shows a robot equipped with sensors according to an embodiment of the invention.

FIG. 1 shows an example, in perspective view, of such a robot. The robot having first and second sets of wheels connected to drives for moving the robot in corresponding different direction on the grid. The first and second set of wheels are oriented perpendicular to each other. For the sake of clarity, a Cartesian coordinate system is shown with its x- and y-axes aligned along the principal directions of the rectangular vehicle body.

The robot further comprises means for receiving instructions with information of the number of track crossings to pass between start and stop positions in x- and y-directions according to the set route.

Sensors are attached to the robot and directed at the tracks along the route of the robot. In one embodiment of the invention, the sensors are optical sensors detecting reflection of light from the tracks.

Figure 2:
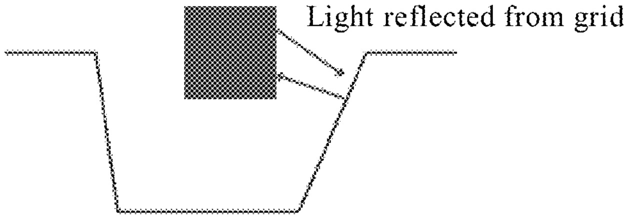
FIG. 2 illustrates how light is reflected from the grid.

FIG. 2 illustrates the principle of using optical sensors as track sensors for detecting the position of a robot relative to tracks and grid structure. Light is reflected from tracks when a robot is moving along the tracks in x- or y-directions. When the robot is passing a track crossing, the reflected intensity of the detected light will change.

In one embodiment of the invention, at least one sensor is attached to one side, running in the x-direction of the robot, and another sensor is attached to the other side, running in the y-direction of the robot. This means that at least one sensor can be active when the robot is moving in either of the x- and y-directions.

In one embodiment of the invention, the sensors are connected to wheel-supports located at each side of the robot. A wheel support will typically hold two wheels, as illustrated in FIG. 1. Active wheel supports enable contact between wheels and tracks. Pair of wheel supports on opposite sides of the robot are active at the same time when they are lowered from the body of the robot into the tracks.

In one embodiment of the invention, optical sensors are used. Other or additional sensors for detecting position of the robot relative to the tracks may also be used, e.g., acoustic sensors. A combination of different types of sensors is feasible.

The remotely operated vehicle further comprises detecting and monitoring means connected to the sensors. This will enable monitoring of track crossings passed when moving the vehicle in the x- and y-directions according to the set route.

The vehicle further comprises a controller for controlling the drives of the vehicle according to the number of track crossings passed. When this is close to the total number of track crossings to pass between the start and stop positions in respective x- and y-directions along the set route, the controller will initiate deceleration of the robot.

In one aspect, embodiments disclosed herein further comprise a method for tracking the position of a remotely operated vehicle or robot following a set route relative to tracks laid out on a frame structure forming a grid. The vehicle having first and second sets of wheels connected to drives for moving the vehicle in corresponding x- and y-directions on the grid. The method comprises several steps.

The first step is receiving information of the number of track crossings to pass between start and stop positions in x- and y-directions according to the set route. This information is passed to the controller of the remote operated vehicle.

The next step is directing sensors attached to the vehicle at the tracks along the route of the vehicle. This is described above and illustrated in FIG. 2.

One embodiment comprises attaching at least one sensor to one side of the robot, i.e. in the x-direction of the robot, and attaching another sensor to the other side, i.e. in the y-direction of the robot, where x- and y-directions of the robot correspond to the x- and y-directions of the grid structure of tracks the robot is moving on.

Another embodiment of the method comprises attaching at least one sensor to a wheel support. By doing this a sensor will be lowered into the track section and will be closer to the track it is directed at when the wheel support it is connected to is active, i.e., contact between wheels and tracks is established.

When a robot is moving along the tracks it will pass one or more crossings on its way from a start position to a stop position.

Figure 3:
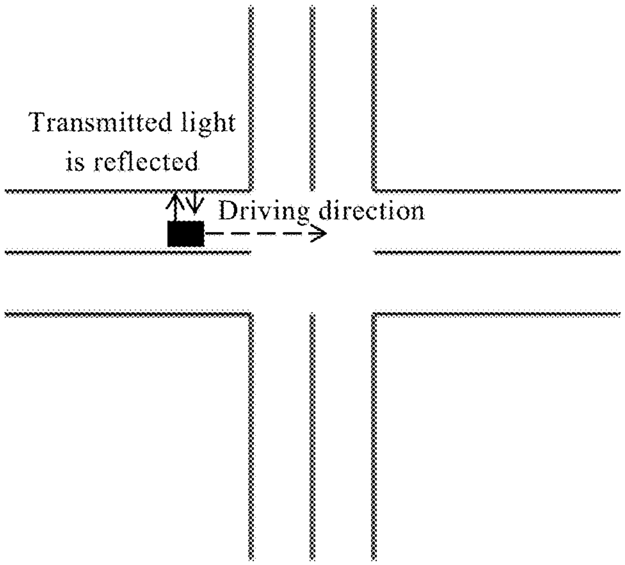
FIG. 3 illustrates the principle of using track sensors for detecting the position of a robot relative to tracks.

FIG. 3 illustrates this principle where a robot equipped with a light sensor receives reflected light from the track. When the robot is moving through a track crossing, the intensity of the light reflected will drop since no light is reflected.

The next step of an embodiment of the invention is detecting and monitoring track crossings passed when moving the vehicle in the x- and y-directions according to the set route. Detection of track crossings is based on measured intensity of reflected light. If other types of sensors are used, the detection is based on detection of change in received signal.

Figure 4:
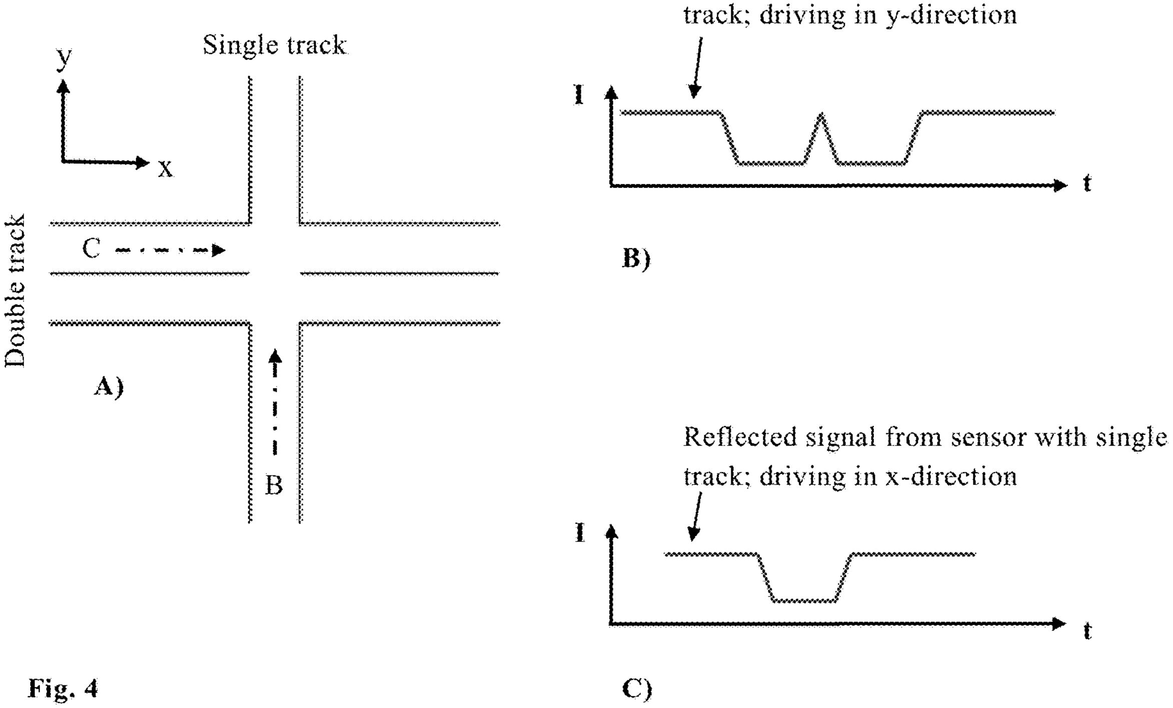
FIG. 4 shows light sensor signals are generated when moving a robot in x- and y-directions of a grid structure.

FIG. 4 shows light sensor signals generated when moving a robot in x- and y-directions of tracks laid out as a grid structure. Based on the sensor signals, the robot is able to keep track on the number of track crossings passed.

FIG. 4A shows an example of a track crossing, where there are double tracks in the x-direction, and single tracks in the y-direction. A robot running in the x-direction will have sensors directed in the y-direction, ref. FIG. 3. It will thus detect the single-track configuration. When the robot is running in the y-direction it will detect the double track configuration. The letters B and C in FIG. 4A are referring to corresponding signals shown in FIGS. 4B and 4C.

FIG. 4B shows light intensity (I) versus time (t) when a robot is running in the y-direction shown in FIG. 4A. As shown in the figure the light intensity will be high if the sensor receives a strong reflected signal from the track it is directed at. When the sensor is passing the track crossing, the signal will drop since a reflected signal is absent. A temporary peak of the intensity of the reflected light will occur due to the double track configuration. After passing the track crossing, the intensity, I, of the reflected signal will become high again until next track crossing.

FIG. 4C shows a similar reflected signal as shown in 4B, but with only one drop in the detected signal due to the single-track configuration.

The last step of this embodiment of the invention is transmitting a signal to a controller, controlling the drives of the wheels of the robot when the number of track crossings passed is close to the total number of track crossings to pass between the start and stop positions in respective x- and y-directions along the set route.

In this way, the controller can control precise deceleration of the robot prior to the next crossing where it is to change direction.

One embodiment of the invention comprises arranging sensors placed on active wheel supports comprising the sets of wheels for detecting track crossings as described above, as well as arranging sensors on passive wheel supports for measuring distance to next track crossing. This can be used for providing an early warning signal, telling the controller that the next track crossing is approaching.

According to one embodiment of the invention, the signal transmitted to the controller can be used for performing precise control of deceleration and acceleration of the vehicle for following a set route along x- and y-directions.

The following describes an example of how the inventive method can be implemented on the remotely operated vehicle described above.

The tracks laid out on a frame structure forming a grid can be addressed similar as the cells in a spreadsheet. If for instance a storage grid comprises 100 columns or cells for storing bins, each cell can be given a unique identity. A grid with 10 cells in the x-direction and 10 cells in the y-direction will make a 2-dimensional track configuration running on top of 100 cells.

When the movements of the robot are controlled, a controller will keep track of which cell the robot is to pick up a bin from, and which cell to place a bin in. Based on this, the controller will set up a route the robot is to follow.

If, for instance, the robot is to pick up a bin from cell C2, and place it in cell H8, and cells C8 and H2 are blocked by other robots, the following route may be set up by the controller. First leg of the route is from C2 to C5, the next leg is from C5 to H5, and the last leg is from H5 to H8. According to said route, the robot must start and stop three times. It will first drive in the y-direction, then the x-direction, and finally in the y-direction. The robot will receive the number of track crossings to pass between each start and stop position according to said route.

The sensors attached to the robot and detecting means comprised in the robot will detect the number of track crossings passed in each direction. When the number of passed crossings is close to the total number of track crossings to pass on each leg, a signal is transmitted to the controller controlling the movements of the robot. In this way, the controller will know exactly when deceleration should start, as well as the rate and duration of acceleration.

According to embodiments of the present invention, the position of the robot is detected by integrated tracking devices for detecting the number of crossings passed in x- and y-directions relative to the tracks laid out as a grid structure is tracked.

The features of the invention can be used in addition to other distance measuring means comprised in the robot or in external means.

This method according to embodiments of the invention will provide a simple yet precise way of detecting the position of a robot relative to a frame structure. This enables fast and efficient movements of robots moving on tracks laid out on top of the frame structure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A vehicle for an automated storage and retrieval system, wherein the vehicle is configured to follow a route relative to tracks of the automated storage and retrieval system, wherein the route includes one or more track crossings, and wherein the vehicle comprises:

a first set of wheels capable of moving the vehicle in a first direction;

a second set of wheels capable of moving the vehicle in a second direction perpendicular to the first direction; and one or more sensors attached to the vehicle and configured to detect the one or more track crossings while the vehicle is moving in the first direction or the second direction;

wherein a first sensor of the one or more sensors is configured to detect the one or more track crossings while the vehicle is moving in the first direction, wherein a second sensor of the one or more sensors is configured to detect the one or more track crossings while the vehicle is moving in the second direction, wherein the first sensor of the one or more sensors is directed in the second direction, and wherein the second sensor of the one or more sensors is directed in the first direction.

2. The vehicle of claim 1, wherein at least one sensor of the one or more sensors is an optical sensor.

3. The vehicle of claim 2, wherein the optical sensor is configured to detect a different intensity of reflected light when the optical sensor passes a track crossing of the one or more track crossings compared to when the optical sensor is between the one or more track crossings.

4. The vehicle of claim 1, wherein the vehicle further comprises:

a receiver configured to receive a total number of track crossings between a start position and a stop position of the route;

drives configured to drive the first set of wheels and the second set of wheels; and a controller configured to control the drives based on a number of track crossings detected by at least one sensor of the one or more sensors.

5. The vehicle of claim 1, wherein the vehicle further comprises a first wheel support supporting the first set of wheels, and wherein at least one sensor of the one or more sensors is attached to the first wheel support.

6. The vehicle of claim 5, wherein the first wheel support is operable between an active state, in which the first set of wheels are engaged with the tracks, and a passive state, in which the first set of wheels are disengaged from the tracks.

7. The vehicle of claim 6, wherein the at least one sensor attached to the first wheel support is configured to detect the one or more track crossings when the first wheel support is in the active state.

8. The vehicle of claim 7, wherein the at least one sensor attached to the first wheel support does not detect the one or more track crossings when the first wheel support is in the passive state.

9. The vehicle of claim 5, wherein the vehicle further comprises a second wheel support supporting the second set of wheels, and wherein at least one second sensor of the one or more sensors is attached to the second wheel support.

10. The vehicle of claim 9, wherein the second wheel support is operable between an active state, in which the second set of wheels are engaged with the tracks, and a passive state, in which the second set of wheels are disengaged from the tracks, wherein the second wheel support is operable in the active state when the first wheel support is in the passive state, and wherein the second wheel support is operable in the passive state when the first wheel support is in the active state.

11. A method for tracking a position of a vehicle following a route relative to tracks of an automated storage and retrieval system, wherein the route includes one or more track crossings, and wherein the vehicle comprises:

a first set of wheels capable of moving the vehicle in a first direction;

a second set of wheels capable of moving the vehicle in a second direction perpendicular to the first direction; and one or more sensors attached to the vehicle and configured to detect the one or more track crossings while the vehicle is moving in the first direction or the second direction;

wherein the method comprises:

moving the vehicle in the first direction while detecting the one or more track crossings by a first sensor of the one or more sensors, and wherein the first sensor of the one or more sensors is directed in the second direction.

12. The method of claim 11, wherein the method further comprises moving the vehicle in the second direction while detecting the one or more track crossings by a second sensor of the one or more sensors, wherein the second sensor of the one or more sensors is directed in the first direction.

13. The method of claim 11, wherein the at least one sensor of the one or more sensors is an optical sensor, and wherein the method further comprises optically detecting the one or more track crossings.

14. The method of claim 13, wherein optically detecting the one or more track crossings comprises detecting a different intensity of reflected light when the optical sensor passes a track crossing of the one or more track crossings compared to when the optical sensor is between one or more track crossings.

15. The method of claim 11, wherein the vehicle further comprises:

a receiver;

drives configured to drive the first set of wheels and the second set of wheels; and a controller configured to control the drives;

wherein the method further comprises:

receiving a total number of track crossings between a start position and a stop position of the route; and controlling the drives of the first set of wheels and the second set of wheels based on the total number of track crossings and a number of track crossings detected by the at least one sensor of the one or more sensors.

16. The method of claim 11, wherein the vehicle further comprises:

a first wheel support supporting the first set of wheels, wherein at least one sensor of the one or more sensors is attached to the first wheel support;

wherein the method further comprises:

moving the first wheel support from a passive state, in which the first set of wheels are disengaged from the tracks, to an active state, in which the first set of wheels are engaged with the tracks;

wherein detecting the one or more track crossings by the at least one sensor of the one or more sensors comprises detecting the one or more track crossings by the at least one sensor attached to the first wheel support when the first wheel support is in the active state.

17. A vehicle for an automated storage and retrieval system, wherein the vehicle is configured to follow a route relative to tracks of the automated storage and retrieval system, wherein the route includes one or more track crossings, and wherein the vehicle comprises:

a first set of wheels capable of moving the vehicle in a first direction;

a second set of wheels capable of moving the vehicle in a second direction perpendicular to the first direction;

one or more sensors attached to the vehicle and configured to detect the one or more track crossings while the vehicle is moving in the first direction or the second direction;

a receiver configured to receive a total number of track crossings between a start position and a stop position of the route;

drives configured to drive the first set of wheels and the second set of wheels; and a controller configured to control the drives based on a number of track crossings detected by at least one sensor of the one or more sensors.

18. A vehicle for an automated storage and retrieval system, wherein the vehicle is configured to follow a route relative to tracks of the automated storage and retrieval system, wherein the route includes one or more track crossings, and wherein the vehicle comprises:

a first set of wheels capable of moving the vehicle in a first direction;

a second set of wheels capable of moving the vehicle in a second direction perpendicular to the first direction;

one or more sensors attached to the vehicle and configured to detect the one or more track crossings while the vehicle is moving in the first direction or the second direction; and a first wheel support supporting the first set of wheels, wherein at least one sensor of the one or more sensors is attached to the first wheel support, wherein the first wheel support is operable between an active state, in which the first set of wheels are engaged with the tracks, and a passive state, in which the first set of wheels are disengaged from the tracks, wherein the at least one sensor attached to the first wheel support is configured to detect the one or more track crossings when the first wheel support is in the active state and wherein the at least one sensor attached to the first wheel support does not detect the one or more track crossings when the first wheel support is in the passive state.

19. A method for tracking a position of a vehicle following a route relative to tracks of an automated storage and retrieval system, wherein the route includes one or more track crossings, and wherein the vehicle comprises:

a first set of wheels capable of moving the vehicle in a first direction;

a second set of wheels capable of moving the vehicle in a second direction perpendicular to the first direction;

one or more sensors attached to the vehicle and configured to detect the one or more track crossings while the vehicle is moving in the first direction or the second direction;

a receiver;

drives configured to drive the first set of wheels and the second set of wheels; and a controller configured to control the drives;

wherein the method comprises:

moving the vehicle in the first direction or the second direction while detecting the one or more track crossings by at least one sensor of the one or more sensors;

receiving a total number of track crossings between a start position and a stop position of the route; and controlling the drives of the first set of wheels and the second set of wheels based on the total number of track crossings and a number of track crossings detected by the at least one sensor of the one or more sensors.

* * * * *